(12) United States Patent
Reid et al.

(10) Patent No.: US 11,590,482 B1
(45) Date of Patent: *Feb. 28, 2023

(54) ALUMINA BINDERS FOR SCR CATALYSTS (71) Applicant: Johnson Matthey Public Limited Company, London (GB)

(72) Inventors: Stuart David Reid, Royston (GB); Alexander Nicholas Michael Green, Royston (GB); Guy Richard Chandler, Royston (GB)

(73) Assignee: Johnson Matthey Public Limited Company, London (GB)

( * ) Notice: Subject to any disclaimer, the term of this patent is extended or adjusted under 35 U.S.C. 154(b) by 400 days.

This patent is subject to a terminal disclaimer.

(21) Appl. No.: 16/297,868

(22) Filed: Mar. 11, 2019

Related U.S. Application Data

(63) Continuation of application No. 14/739,431, filed on Jun. 15, 2015, now Pat. No. 10,226,762, which is a continuation of application No. 13/465,564, filed on May 7, 2012, now abandoned.

(51) Int. Cl.
*B01J 29/76* (2006.01)
*B01J 35/00* (2006.01)
*B01J 35/04* (2006.01)
*B01J 29/80* (2006.01)
*B01J 29/72* (2006.01)

(52) U.S. Cl.
CPC ............. *B01J 29/763* (2013.01); *B01J 29/80* (2013.01); *B01J 35/0013* (2013.01); *B01J 35/04* (2013.01); *B01J 29/7215* (2013.01)

(58) Field of Classification Search
None
See application file for complete search history.

(56) References Cited

U.S. PATENT DOCUMENTS

| 5,212,130 A | * | 5/1993 | Addiego | B01J 23/02 502/60 |
| 2003/0115859 A1 | * | 6/2003 | Deeba | B01J 29/78 60/297 |
| 2007/0259770 A1 | * | 11/2007 | Hofmann | B01J 29/46 502/60 |
| 2009/0196812 A1 | * | 8/2009 | Bull | B01J 35/1023 423/239.1 |
| 2011/0305613 A1 | * | 12/2011 | Stiebels | B01J 29/80 423/213.5 |
| 2011/0305614 A1 | * | 12/2011 | Stiebels | B01D 53/9418 423/213.5 |

\* cited by examiner

*Primary Examiner* — Colin W. Slifka (57) ABSTRACT

Provided is a catalytic washcoat having a catalyst component and an alumina binder, wherein the catalyst component includes an aluminosilicate molecular sieve having a beta (BEA) and/or chabazite (CHA) framework, and about 1 to about 10 weight percent of a base metal component comprising iron and/or copper, wherein said weight percent is based on the weight of the aluminosilicate molecular sieve.

20 Claims, 4 Drawing Sheets

ALUMINA BINDERS FOR SCR CATALYSTS

CROSS-REFERENCE TO RELATED APPLICATIONS

This application is a continuation application of U.S. patent application Ser. No. 14/739,431, filed Jun. 15, 2015, which is a continuation application of U.S. patent application Ser. No. 13/465,564, filed May 7, 2012, which is a continuation application of U.S. patent application Ser. No. 13/355,078, filed Jan. 20, 2012, and claims priority of U.S. Provisional Application No. 61/498,322, filed Jun. 17, 2011, the disclosures of all which are incorporated herein by reference in their entireties for all purposes.

BACKGROUND

A.) Field of Use

The present invention relates to catalysts, systems, and methods that are useful for treating an exhaust gas which occurs from combusting hydrocarbon fuel—more particularly exhaust gas containing nitrogen oxides, such as an exhaust gas produced by diesel engines or coal-fired power plants.

B.) Description of Related Art

Molecular sieves, such as zeolites, are microporous or mesoporous crystalline solids with well-defined structures derived from a repeating, interconnected framework of atoms. Zeolite framework types are defined in terms of their geometric arrangement of atoms, with different frameworks possessing different physical and/or chemical properties. (Codes for specific framework types are assigned to established structures that satisfy the rules of the IZA Structure Commission.)

In general, molecular sieves can selectively sort molecules based primarily on a size exclusion process and also can accommodate a wide variety of cations, such as $Na^+$, $K^+$, $Ca^{2+}$, $Mg^{2+}$ and others, which are loosely held to the framework and thus can readily be exchanged for others in a contact solution. These properties, as well as others, attribute to molecular sieves usefulness as catalysts in certain reactions including the catalytic reduction of nitrogen oxides ($NO_x$), the catalytic conversion of hydrocarbons, such as methane into olefins, and others.

As catalysts, zeolites and other molecular sieves generally serve as heterogeneous catalyst (i.e., solid catalyst in contact with a gas and/or liquid reactant). These catalysts are usually supported by a substrate and, thus, the preparation of a molecular sieve catalyst composition typically involves the use of one or more binders, such as alumina, silica, titania, ceria, and zirconia. The selection of a binder is critical and is dependent upon its intended purpose. For example, binders can be used to enhance adhesion of the catalyst material to its carrier surface. Since the intended reactants interact with the catalyst's surface, the surface chemistry of the composition is an important consideration. Other important considerations include the reaction conditions (temperature, moisture content, etc.), mechanisms, and desired results. These reaction conditions which can vary significantly between olefin synthesis and $NO_x$ reduction, for example.

Of particular importance in the present invention are molecular sieves that are useful for $NO_x$ reduction in exhaust gases. Exhaust gas is emitted when fuels such as natural gas, gasoline, diesel fuel, fuel oil or coal is combusted and is discharged into the atmosphere through an exhaust pipe, flue gas stack, or the like. The largest portions of most combustion exhaust gas contain relatively benign nitrogen ($N_2$), water vapor ($H_2O$), and carbon dioxide ($CO_2$); but the exhaust gas also contains in relatively small part noxious and/or toxic substances, such as carbon monoxide (CO) from incomplete combustion, hydrocarbons (HC) from unburnt fuel, nitrogen oxides ($NO_x$) from excessive combustion temperatures, and particulate matter (mostly soot). The production of $NO_x$, which includes nitric oxide (NO), nitrogen dioxide ($NO_2$), and nitrous oxide ($N_2O$), is particularly problematic for lean burn engines, such as diesel engines for mobile applications. Therefore, it is desirable to eliminate these undesirable components from an exhaust gas, preferably by a process that does not generate other noxious or toxic substances in the process.

One method for converting $NO_x$ into more benign substances is commonly referred to as Selective Catalytic Reduction (SCR). An SCR process involves the conversion of $NO_x$, in the presence of a catalyst and with the aid of a reducing agent, into elemental nitrogen ($N_2$) and water. In an SCR process, a gaseous reductant, typically anhydrous ammonia, aqueous ammonia, or urea, is added to an exhaust gas stream prior to contacting the catalyst. The reductant is absorbed onto a catalyst and the $NO_x$ reduction reaction takes place as the gases pass through or over the catalyzed substrate. The chemical equation for a stoichiometric reaction using either anhydrous or aqueous ammonia for an SCR process is:

$$4NO + 4NH_3 + 3O_2 \longrightarrow 4N_2 + 6H_2O$$
$$2NO_2 + 4NH_3 + 3O_2 \longrightarrow 3N_2 + 6H_2O$$
$$NO + NO_2 + 2NH_3 \longrightarrow 2N_2 + 3H_2O$$

Known SCR catalysts include zeolites or other molecular sieves disposed on a monolithic substrate. For example, U.S. Pat. No. 6,150,291 states that the molecular sieve material may be selected from the group consisting of ZSM-5, Y-zeolite, mordenite, beta-zeolite, omega-zeolite, rho-zeolite, borosilicates, and iron silicates. U.S. Pat. No. 6,919,047 further states that one of the best catalysts recently suggested for NO decomposition is copper ion-exchanged zeolite ZSM-5, although its catalytic activity is effective only at relatively low space velocities.

In U.S. Pat. No. 5,417,949, it is shown that the selection of binders influences the efficacy of the catalytic $NO_x$ reduction. For example, the '949 patent provides experimental data "demonstrating that the titania, zirconia, and silica binders [used with a ZSM-5 zeolite] improve $NO_x$ conversion at elevated temperatures in comparison with alumina binders." The '949 patent further states that "unlike alumina binders, low acidity refractory oxide binders such as titania, zirconia, or silica do not interact with molecular sieves such as, for example, zeolites, to increase the acid catalytic activity thereof. Consequently, molecular sieves can be bound with low acidity titania, zirconia, or silica in accordance with the method of this invention without increasing the molecular sieves intrinsic activity as might occur with an alumina binder."

Other publications, such as U.S. Pat. No. 6,759,358, note that when alumina sol is used exclusively as a binder, the resulting washcoat slurry is not stable and the binder tends to separate from the catalytic material. The '358 also suggests the importance of including silica into a binder system for ZSM-5 zeolites used in $NO_x$ reduction processes.

However, there remains a need for improving $NO_x$ reducing catalyst compositions and SCR processes for converting $NO_x$ to $N_2$ and $O_2$.

SUMMARY OF THE INVENTION

Applicants have unexpectedly found that alumina binders, compared to other binders such as silica, enhance the performance of certain molecular sieve-based catalysts in an SCR process. Performance improvements include better high temperature performance, better selectivity, and improved high temperature thermal durability. This discovery is contrary to the conventional belief that silica binders provide superior $NO_x$ reduction performance in SCR processes.

Accordingly, provided is a composition comprising (a) a catalyst component comprising an aluminosilicate molecular sieve having a beta (BEA) and/or chabazite (CHA) framework, and about 1 to about 10 weight percent of a base metal component comprising iron and/or copper, wherein said weight percent is based on the weight of the aluminosilicate molecular sieve; and (b) about 1 to about 30 weight percent of a binder consisting essentially of alumina, wherein said weight percent is based on the weight of the aluminosilicate molecular sieve, wherein said catalyst component and said binder are in an aqueous dispersion.

In another embodiment, provided is an article comprising (a) a honeycomb substrate adapted for use in an SCR process and having a plurality of walls and a plurality of surfaces that define a plurality of channels and/or openings; and (b) a washcoat comprising the catalyst composition described herein, wherein said washcoat is applied to at least a portion of said surfaces and/or is embodied within at least a portion of said walls.

In another embodiment, provided is a method for reducing $NO_x$ in an exhaust gas comprising contacting the exhaust gas with a catalyst composition described herein for a time and temperature sufficient to reduce at least 90 percent of $NO_x$ in said exhaust gas, wherein said contacting occurs at a temperature of at least 350° C.

In yet another embodiment, provided is a system for reducing $NO_x$ in an exhaust gas comprising (a) a honeycomb substrate adapted for use in an SCR process, having an inlet end and an outlet end, and having a plurality of walls and a plurality of surfaces that define a plurality of channels and/or openings, (b) a washcoat as described herein, wherein said washcoat is applied to at least a portion of said surfaces or is embodied within at least a portion of said walls, (c) a conduit for directing an exhaust gas from a combustion chamber to said honeycomb substrate, wherein said conduit is in fluid contact with said inlet end of said honeycomb substrate, and (d) a reductant injection system in fluid communication with said conduit and disposed upstream of said honeycomb substrate.

DETAILED DESCRIPTION OF PREFERRED EMBODIMENTS OF THE INVENTION

The present invention pertains to improved compositions and methods for reducing $NO_x$ in an exhaust gas. Preferably, the catalytic composition comprises an aluminosilicate molecular sieve having a chabazite (CHA) and/or a beta (BEA) framework, wherein the catalyst composition is supported by a substrate, such as a ceramic honeycomb monolith adapted for use in an SCR process. The catalytic composition further comprises an alumina binder that preferably enhances the molecular sieve's adhesion to the monolith.

In certain preferred embodiments, molecular sieves for use in the present invention have a BEA or CHA crystalline structure, as defined by International Zeolite Association, and include naturally occurring (i.e. mineral) and synthetic molecular sieves, preferably synthetic molecular sieves because the molecular sieves can have a more uniform: silica-to-alumina ratio (SAR), crystallite size, crystallite morphology, and the absence of impurities (e.g. alkaline earth metals). The distinction between natural and synthetic molecular sieves is not merely arbitrary, but reflects differences in the properties between the materials, which may in turn lead to differences in activity in the method of the present invention. Specific molecular sieves that are useful in the present application include, but are not limited to Beta, SSZ-13, SSZ-62, LZ-218, Linde D, Linde R, Phi, ZK-14, and ZYT-6. Other molecular sieves useful in the present invention are aluminosilicates having a framework structure of LEV, AEI, PAU, UFI, or DDR. Exemplary materials include Sigma-1 (DDR), SAPO-18 (AEI), SSZ-39 (AEI), and Nu-3 (LEV). Such molecular sieves are commercially available. A particularly preferred chabazite is SSZ-13.

Preferred aluminosilicate molecular sieves having a CHA framework also have a mole ratio of silica to alumina greater than about 10, more preferably from about 15 to about 250, more preferably from about 20 to about 50, and even more preferably from about 25 to about 35. The silica to alumina ratio of molecular sieves may be determined by conventional analysis. This ratio is meant to represent, as closely as possible, the silica-to-alumina ratio in the atomic framework of the molecular sieve crystal and preferably excludes aluminum in the binder or in cationic or other form within the channels. It will be appreciated that it may be extremely difficult to directly measure the silica to alumina ratio of molecular sieve after it has been combined with a binder material. Accordingly, the silica to alumina ratio has been expressed hereinabove in term of the silica to alumina ratio of the parent molecular sieve, i.e., the molecular sieve used to prepare the catalyst, as measured prior to the combination of this molecular sieve with the other catalyst components.

Preferably, the molecular sieve is ion exchanged to incorporate one or more metals into the molecular sieve. Metals may be of any of the recognized catalytically active metals that are used in the catalyst industry to form metal-exchanged molecular sieves. In one embodiment, at least one non-aluminum base metal is used in conjunction with the molecular sieve to increase the catalyst's performance. As used herein, the phrase "molecular sieve catalyst containing at least one a non-aluminum base metal" means a molecular sieve structure to which one or more base metals other than aluminum has been added by ion exchange, impregnation, isomorphous substitution, etc. Moreover, the terms "base metal-containing molecular sieve catalyst" and "molecular sieve catalyst containing at least one base metal" are used interchangeably herein. As used herein, the term "base metal" means at least one transition metal selected from copper, nickel, zinc, iron, tin, tungsten, cerium, molybdenum, cobalt, bismuth, titanium, zirconium, antimony, manganese, chromium, vanadium, niobium, ruthenium, rhodium, palladium, gold, silver, indium, platinum, iridium, rhenium, tin, antimony, bismuth, and mixtures thereof. Preferred base metals include those selected from the group consisting of chromium, cerium, manganese, iron, cobalt, nickel, and copper, and mixtures thereof. Preferably, at least one of the metals is copper (Cu). Other preferred metals include iron (Fe) and cerium (Ce), particularly in combination with copper (Cu) and particularly when the catalyst is use for $NO_x$ reduction. For embodiments in which the aluminosilicate has a CHA framework, the preferred metal is copper. In embodiments in which the aluminosilicate has a BEA framework, the preferred metal is iron. In certain embodiments, the aluminosilicate is an iron isomorphous BEA.

To form the metal-exchanged molecular sieve, the molecular sieve is blended into a solution containing soluble precursors of the catalytically active metal. The pH of the solution may be adjusted, for example, by the addition of ammonium hydroxide to induce precipitation of the catalytically active cations onto or within the molecular sieve structure. For example, in a preferred embodiment a chabazite is immersed in a solution containing copper nitrate for a time sufficient to allow incorporation of the catalytically active copper cations into the molecular sieve structure by ion exchange and then ammonium hydroxide is added to incorporate un-exchanged copper ions in the solution into the molecular sieve structure by precipitation. The metal-substituted molecular sieve may then be washed, dried and calcined. When iron or copper is used as the metal cation, the metal content of the catalytic material by weight preferably comprises from about 0.1 to about 15 percent by weight and more preferably from about 1 to about 10 percent by weight of the molecular sieve material.

Generally, ion exchange of the catalytic metal cation into or on the molecular sieve may be carried out at room temperature or at a temperature up to about 80° C. over a period of about 1 to 24 hours at a pH of about 7. The resulting catalytic molecular sieve material is preferably dried at about 100 to 120° overnight and calcined at a temperature of at least about 550° C.

Aluminosilicate molecular sieves with application in the present invention can include those that have been treated to improve hydrothermal stability. Conventional methods of improving hydrothermal stability include: (i) de-alumination by steaming and acid extraction using an acid or complexing agent e.g. (EDTA—ethylenediaminetetracetic acid); treatment with acid and/or complexing agent; treatment with a gaseous stream of $SiCl_4$ (replaces Al in the molecular sieve framework with Si); and (ii) cation exchange—use of multivalent cations such as La.

The catalyst component can be combined with a binder and formed into a self-supporting structure (e.g., an extruded article) or applied as a coating (e.g., washcoat) over an inert substrate. To form the catalytic washcoat composition, the molecular sieve, preferably a copper or iron exchanged molecular sieve, is blended with a binder consisting essentially of alumina. Preferred washcoats are aqueous dispersions, preferably colloids, and more preferably sols.

Alumina useful as binders in the present invention can be of several crystalline structures, including alpha ($\alpha$), beta ($\beta$), gamma ($\gamma$), delta ($\delta$), eta ($\eta$), theta ($\theta$), and chi ($\chi$) alumina, with gamma alumina being the most preferred. In certain embodiments, gamma alumina derived from synthetic boehmite. Preferably, the alumina has a mean crystallite size of about 3 to about 60 nm, more preferably about 5 to about 30 nm, and even more preferably about 5 to about 15 nm. The mean crystallite size of the alumina can be measure by standard techniques, such as by X-ray defraction.

Preferred alumina is highly dispersible in aqueous solutions or suspensions, including colloidal suspensions such as sols. Preferably, when dispersed, the alumina binder will have a mean particle size of about 15 to about 500 nm, more preferably about 25 to about 150 nm, and even more preferably about 60 to about 120 nm. In addition to the mean particle size, the particle size distribution of the alumina is preferably small, such that a sample of particles has a variance about the mean of one or less.

The typical amount of binder present is from about 1 to about 35 weight percent, preferably from about 5 to about 25 weight percent, even more preferably from about 10 to about 20 weight percent based on the weight of the molecular sieve.

In certain embodiments, the washcoat further comprises one or more promoters or stabilizers, such as rare earth metals including lanthanum, pore forming agents, or other the addition of Ce and/or Ca for thermodurability at temperatures up to 900° C. In certain preferred embodiments, the washcoat is substantially free of substances imparting catalytic activity for $NO_x$ abatement other than metal exchanged molecular sieves, particularly Fe-BEA and Cu-CHA. In certain preferred embodiments, the washcoat is substantially free of lanthanum or other rare earth stabilizers.

In certain embodiments, the catalytic washcoat is applied to a substrate. Preferred substrates for use in mobile application are monoliths having a so-called honeycomb geometry which comprises a plurality of adjacent, parallel channels, each channel typically having a square, round, hexagonal, or triangular cross-sectional. Other substrates include sheets or screens that can be layer in any suitable fashion including, for example, stacking, rolling, or arraying about a central axis. Other substrates include packed beds can be formed with pellets of the adsorbant, preferably held together with a binder or sintered to form a cohesive mass.

The honeycomb shape provides a large catalytic surface with minimal overall size and pressure drop. The molecular sieve catalyst can be deposited on a flow-through monolith substrate (e.g., a honeycomb monolithic catalyst support structure with many small, parallel channels running axially through the entire part) or filter monolith substrate such as a wall-flow filter, etc. In another embodiment, the molecular sieve catalyst is formed into an extruded-type catalyst. Preferably, the molecular sieve catalyst is coated on a substrate in an amount sufficient to reduce the $NO_x$ contained in an exhaust gas stream flowing through the substrate.

The substrate is preferably constructed of one or more materials that include, as a predominant phase, ceramic, glass-ceramic, glass, cermet, metal, oxides, and combinations thereof. By combinations is meant physical or chemical combinations, e.g., mixtures, compounds, or composites. Some materials that are especially suited to the practice of the present invention although it is to be understood that the invention is not limited to such, are those made of cordierite, mullite, clay, talc, zircon, zirconia, spinel, alumina, silica, borides, lithium aluminosilicates, alumina silica, feldspar, titania, fused silica, nitrides, borides, carbides, e.g., silicon carbide, silicon nitride or mixtures of these. Some typical ceramic substrates are disclosed in U.S. Pat. Nos. 4,127,691 and 3,885,977. Those patents are herein incorporated by reference as filed. A particularly preferred material is cordierite.

In certain embodiments, the honeycomb substrate is contacted with the washcoat at sub-atmospheric pressure and/or above atmospheric pressure to fill the open porosity of the substrate with the washcoat. In certain embodiments, the honeycomb substrate is dipped into the catalytic washcoat composition. In certain embodiments, the coated honeycomb substrate is subjected to a process to remove excess washcoat material. After being loaded with the appropriate amount of washcoat, the coated monolithic structure is dried and calcined at a temperature of about 500° C. for a sufficient time, generally from about 30 minutes to 2 hours, to fix the composition onto the monolithic structure.

The monolithic catalyst according to the invention is particularly useful for the conversion of various exhaust gases, such as carbon monoxide and particularly for $NO_x$. Specifically, the monolithic catalyst is particularly useful for the abatement of $NO_x$ in exhaust gas streams, such as when used as an exhaust gas cleaning catalyst for internal combustion engines and, more particularly, as a catalyst capable of efficiently removing $NO_x$ from an oxygen-rich environment with a lean air-fuel ratios.

Applications:

The catalyst/binder systems described herein can promote the reaction of a reductant, preferably ammonia, with nitrogen oxides to selectively form elemental nitrogen ($N_2$) and water ($H_2O$) vis-n-vis the competing reaction of oxygen and ammonia. In one embodiment, the catalyst can be formulated to favor the reduction of nitrogen oxides with ammonia (i.e., and SCR catalyst). In another embodiment, the catalyst can be formulated to favor the oxidation of ammonia with oxygen (i.e., an ammonia oxidation (AMOX) catalyst). In yet another embodiment, an SCR catalyst and an AMOX catalyst are used in series, wherein both catalyst comprise the metal containing molecular sieve described herein, and wherein the SCR catalyst is upstream of the AMOX catalyst. In certain embodiments, the AMOX catalyst is disposed as a top layer on an oxidative under-layer, wherein the under-layer comprises a platinum group metal (PGM) catalyst or a non-PGM catalyst.

The reductant (also known as a reducing agent) for SCR processes broadly means any compound that promotes the reduction of $NO_x$ in an exhaust gas. Examples of reductants useful in the present invention include ammonia, hydrazine or any suitable ammonia precursor, such as urea (($NH_2$)$_2$CO), ammonium carbonate, ammonium carbamate, ammonium hydrogen carbonate or ammonium formate, and hydrocarbons such as diesel fuel, and the like. Particularly preferred reductant, are nitrogen based, with ammonia being particularly preferred.

According to another aspect of the invention, provided is a method for the reduction of $NO_x$ compounds or oxidation of $NH_3$ in a gas, which comprises contacting the gas with a catalyst composition described herein for the catalytic reduction of $NO_x$ compounds for a time sufficient to reduce the level of $NO_x$ compounds in the gas. In one embodiment, nitrogen oxides are reduced with the reducing agent at a temperature of at least 100° C. In another embodiment, the nitrogen oxides are reduced with the reducing agent at a temperature from about 150 to 750° C. In a particular embodiment, the temperature range is from 175 to 650° C. In another embodiment, the temperature range is from 175 to 550° C. In yet another embodiment, the temperature range is 450 to 750° C., preferably 450 to 700° C., 450 to 650° C., Embodiments utilizing temperatures greater than 450° C. are particularly useful for treating exhaust gases from a heavy and light duty diesel engine that is equipped with an exhaust system comprising (optionally catalyzed) diesel particulate filters which are regenerated actively, e.g. by injecting hydrocarbon into the exhaust system upstream of the filter, wherein the molecular sieve catalyst for use in the present invention is located downstream of the filter.

In another embodiment, the nitrogen oxides reduction is carried out in the presence of oxygen. In an alternative embodiment, the nitrogen oxides reduction is carried out in the absence of oxygen.

The method can be performed on a gas derived from a combustion process, such as from an internal combustion engine (whether mobile or stationary), a gas turbine and coal or oil fired power plants. The method may also be used to treat gas from industrial processes such as refining, from refinery heaters and boilers, furnaces, the chemical processing industry, coke ovens, municipal waste plants and incinerators, coffee roasting plants etc. In a particular embodiment, the method is used for treating exhaust gas from a vehicular lean burn internal combustion engine, such as a diesel engine, a lean-burn gasoline engine or an engine powered by liquid petroleum gas or natural gas.

According to a further aspect, the invention provides an exhaust system for a vehicular lean burn internal combustion engine, which system comprising a conduit for carrying a flowing exhaust gas, a source of nitrogenous reductant, a molecular sieve catalyst described herein. The system can include means, when in use, for controlling the metering means so that nitrogenous reductant is metered into the flowing exhaust gas only when it is determined that the molecular sieve catalyst is capable of catalyzing $NO_x$ reduction at or above a desired efficiency, such as at above 100° C., above 150° C. or above 175° C. The determination by the control means can be assisted by one or more suitable sensor inputs indicative of a condition of the engine selected from the group consisting of: exhaust gas temperature, catalyst bed temperature, accelerator position, mass flow of exhaust gas in the system, manifold vacuum, ignition timing, engine speed, lambda value of the exhaust gas, the quantity of fuel injected in the engine, the position of the exhaust gas recirculation (EGR) valve and thereby the amount of EGR and boost pressure.

In a particular embodiment, metering is controlled in response to the quantity of nitrogen oxides in the exhaust gas determined either directly (using a suitable $NO_x$ sensor) or indirectly, such as using pre-correlated look-up tables or maps—stored in the control means—correlating any one or more of the abovementioned inputs indicative of a condition of the engine with predicted $NO_x$ content of the exhaust gas. The metering of the nitrogenous reductant can be arranged such that 60% to 200% of theoretical ammonia is present in exhaust gas entering the SCR catalyst calculated at 1:1 $NH_3$/NO and 4:3 $NH_3$/$NO_2$. The control means can comprise a pre-programmed processor such as an electronic control unit (ECU).

In a further embodiment, an oxidation catalyst for oxidizing nitrogen monoxide in the exhaust gas to nitrogen dioxide can be located upstream of a point of metering the nitrogenous reductant into the exhaust gas. In one embodiment, the oxidation catalyst is adapted to yield a gas stream entering the SCR molecular sieve catalyst having a ratio of NO to $NO_2$ of from about 4:1 to about 1:3 by volume, e.g. at an exhaust gas temperature at oxidation catalyst inlet of 250 to 450° C. The oxidation catalyst can include at least one platinum group metal (or some combination of these), such as platinum, palladium, or rhodium, coated on a flow-through monolith substrate. In one embodiment, the at least one platinum group metal is platinum, palladium or a combination of both platinum and palladium. The platinum group metal can be supported on a high surface area washcoat component such as alumina, a molecular sieve such as an aluminosilicate molecular sieve, silica, non-zeolite silica alumina, ceria, zirconia, titania or a mixed or composite oxide containing both ceria and zirconia.

In a further embodiment, a suitable filter substrate is located between the oxidation catalyst and the molecular sieve catalyst. Filter substrates can be selected from any of those mentioned above, e.g. wall flow filters. Where the filter is catalyzed, e.g. with an oxidation catalyst of the kind discussed above, preferably the point of metering nitrogenous reductant is located between the filter and the molecular sieve catalyst. Alternatively, if the filter is un-catalyzed, the means for metering nitrogenous reductant can be located between the oxidation catalyst and the filter.

In a further embodiment, the molecular sieve catalyst for use in the present invention is coated on a filter located downstream of the oxidation catalyst. Where the filter includes the molecular sieve catalyst for use in the present invention, the point of metering the nitrogenous reductant is preferably located between the oxidation catalyst and the filter.

In a further aspect, there is provided a vehicular lean-burn engine comprising an exhaust system according to the present invention. The vehicular lean burn internal combustion engine can be a diesel engine, a lean-burn gasoline engine or an engine powered by liquid petroleum gas or natural gas.

EXAMPLES

The following non-limiting examples are provided to further illustrate certain aspects of the invention.

Example 1: Preparation of SCR Catalyst Comprising a CHA Framework

A catalyst slurry was prepared by mixing a copper exchanged aluminosilicate having a chabazite framework and an SAR of about 25.4 with an alumina powder (25F4 DISPAL®) as a binder. The catalyst slurry was coated via FPC onto a 5.66×3 in cordierite honeycomb substrate having 350 cpsi, to produce an article having 3.33 weight percent copper and 12.7 weight percent alumina based on weight of catalyst. The supported catalyst is then hydrothermally ages at 800° C. for 5 hours.

Comparative Example 1

The preparation method described in Example 1 was repeated, except that the slurry was prepared with 8.8 weight percent of Ludox® AS40 colloidal silica (40 weight percent silicon dioxide suspension in water) as a binder to produce a catalyst article having a solid weight of 12.7 weight percent silica based on the weight of the catalyst.

Example 2: NO Conversion

The supported catalysts prepared in Examples 1 and 2 were tested for $NO_x$ conversion and $N_2O$ production using a Synthetic Catalyst Activity Test (SCAT) rig under the following conditions: feed gas=500 ppm NO, $NH_3$, alpha=1.5, a space velocity (SV) of 60,000/hour.

Figure 1:
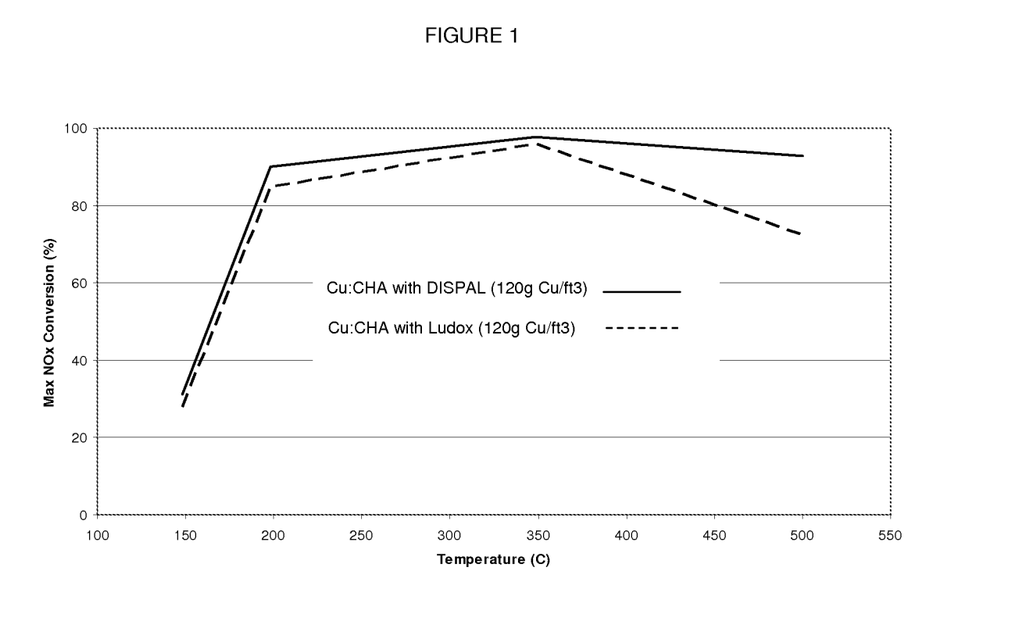
FIG. 1 is a graphical depiction of $NO_x$ conversion data using NO feed gas according to an embodiment of the invention.
Figure 2:
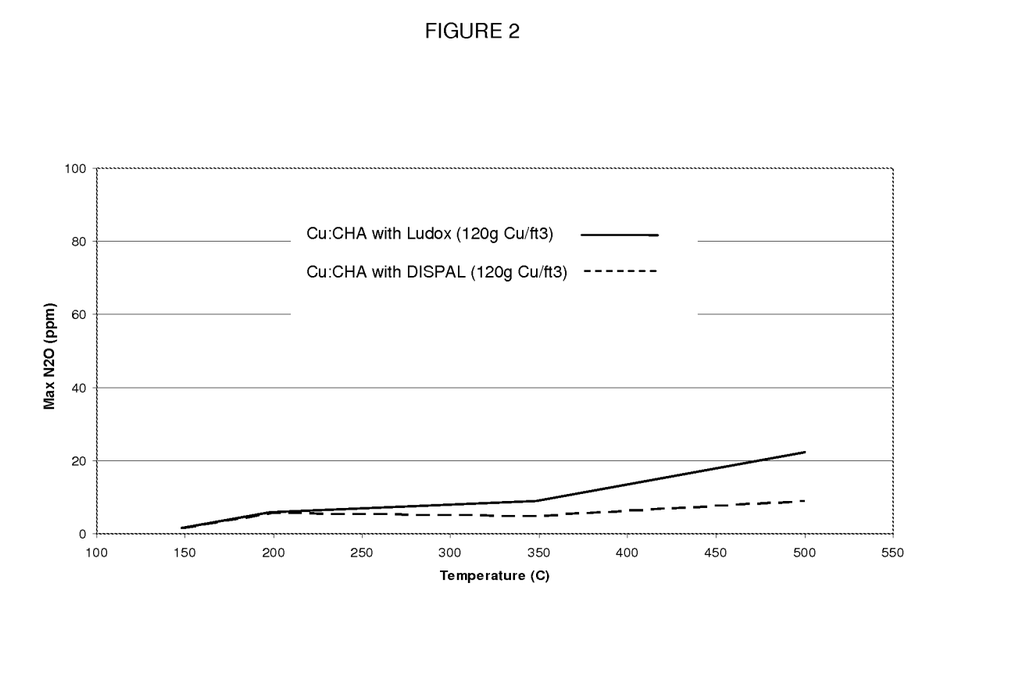
FIG. 2 is a graphical depiction of $N_2O$ generation data using NO feed gas according to an embodiment of the invention.

The samples were tested to determine $NO_x$ conversion and $N_2O$ production, each as a function of temperature. $NO_x$ conversion data at 20 ppm $NH_3$ slip (corrected for $N_2O$ make) is shown in FIG. 1 and $N_2O$ production data is shown in FIG. 2.

The results show that a supported catalyst having an alumina binder has improved maximum NO conversion, particularly at 500° C., compared to a supported catalyst having a silica binder. It is believe that this improved performance is due, in part, to lower levels of $NH_3$ oxidation.

Example 3: NO/$NO_2$ Conversion

The test procedure of Example 2 is repeated, except that the feed gas was a 50/50 mixture of NO and $NO_2$.

Figure 3:
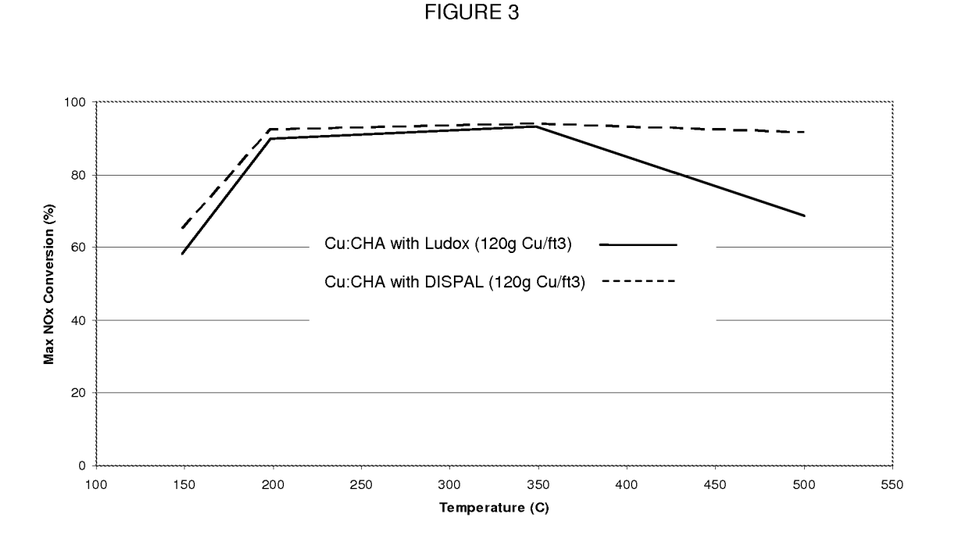
FIG. 3 is a graphical depiction of $NO_x$ conversion data using $NO/NO_2$ feed gas according to an embodiment of the invention.
Figure 4:
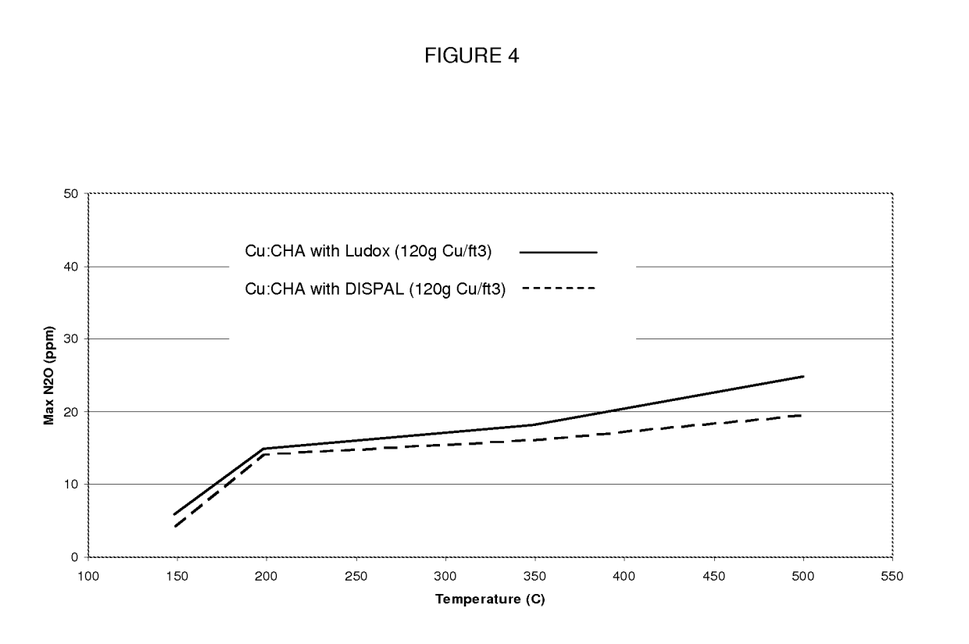
FIG. 4 is a graphical depiction of $N_2O$ generation data using $NO/NO_2$ feed gas according to an embodiment of the invention.

$NO_x$ conversion data at 20 ppm $NH_3$ slip (corrected for $N_2O$ make) is shown in FIG. 3 and $N_2O$ production data is shown in FIG. 4.

The results show that the supported catalyst having an alumina binder improves maximum conversion of NO, compared to a supported catalyst having a silica binder.

Example 4: Preparation of SCR Catalyst Comprising an Alumina Binder (High Temperature Hydrothermal Aging)

The method in Example 1 for preparing an SCR catalyst was repeated, except that the supported catalyst was aged at 900° C. for 2 hours.

Comparative Example 2: Preparation of SCR Catalyst Comprising a Silica Binder (High Temperature Hydrothermal Aging)

The method in Comparative Example 1 for preparing an SCR catalyst was repeated, except that the supported catalyst was aged at 900° C. for 2 hours.

Example 5: NO/$NO_2$ Conversion

Figure 5:
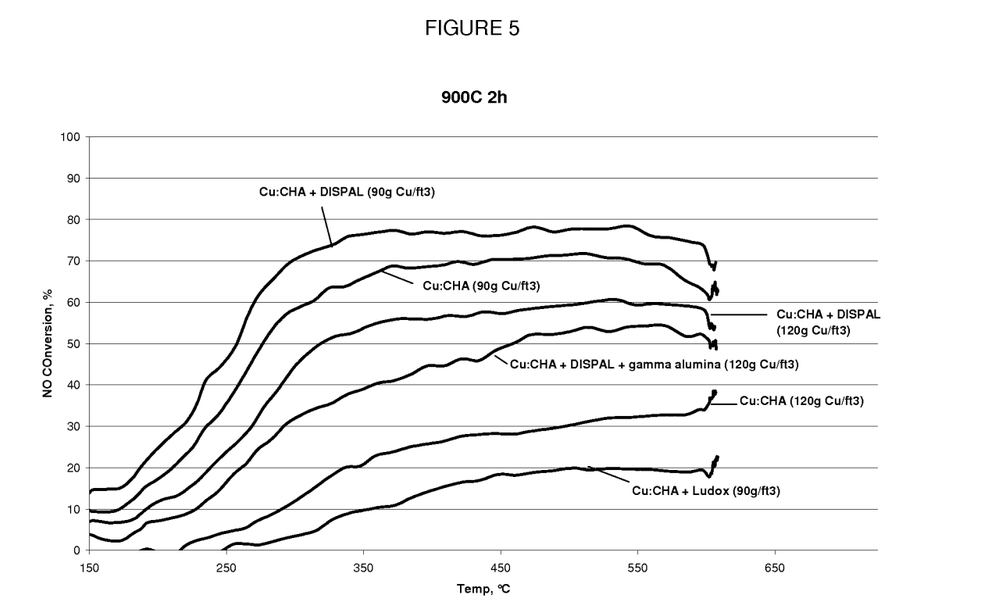
FIG. 5 is a graphical depiction of $NO_x$ conversion data after high temperature hydrothermal aging of an embodiment of the invention.

The test procedure of Example 3 is repeated using the supported catalyst prepared in Example 4 and Comparative Example 2. The feed gas had an alpha=1.1 and an SV=90,000/hour. $NO_x$ conversion data is shown in FIG. 5.

The results show that the supported catalyst having an alumina binder improves maximum conversion of NO conversion after high temperature hydrothermal aging compared to a supported catalyst having a silica binder.

Example 6: High Temperature Durability—Alumina Loading

The preparation method described in Example 1 was repeated to prepare three supported catalysts: Catalyst A which was prepared with 8.8 weight percent based on weight of catalyst of an alumina powder (25F4 DISPAL®) as a binder, Catalyst B which was prepared with 12.4 weight percent based on weight of catalyst of an alumina powder (25F4 DISPAL®) as a binder, and Catalyst C which was prepared with 16.2 weight percent based on weight of catalyst of an alumina powder (25F4 DISPAL®) as a binder. Catalyst A, B, and C where all hydrothermally aged at 900° C. for 4 hours.

Figure 6:
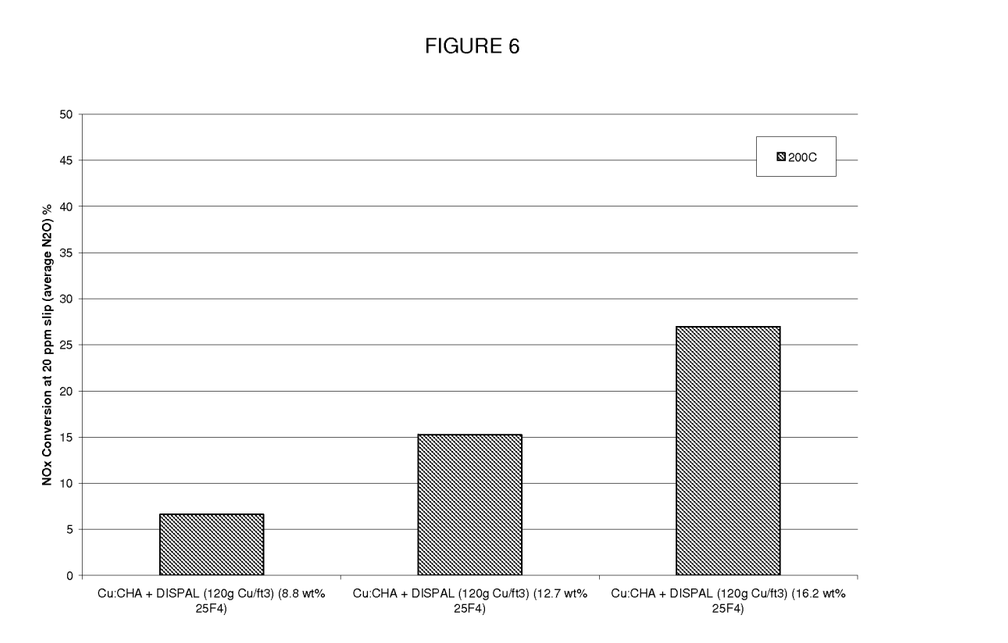
FIG. 6 is graphical depiction of $NO_x$ conversion data at different alumina loading according to embodiments of the invention.

Catalyst A, B, and C were tested for $NO_x$ conversion at 200° C. using a SCAT rig similar to that described in Example 2. $NO_x$ conversion data at 20 ppm $NH_3$ slip (average $N_2O$) is shown in FIG. 6.

The results show that increasing the loading of alumina binder in an SCR catalyst improves the catalyst's high temperature durability.

Example 7: Preparation of SCR Catalyst Comprising Copper Exchanged CHA and Iron Exchanged BEA Frameworks A catalyst slurry was prepared by mixing a molecular sieve material having a blend of copper exchanged chabazite framework and iron exchanged beta framework (in a 3:1 ratio) with an alumina powder (25F4 DISPAL®) as a binder. The catalyst slurry was coated onto a cordierite honeycomb substrate. The supported catalyst is then hydrothermally ages at 800° C. for 5 hours.

Example 8: Preparation of SCR Catalyst Comprising Copper Exchanged CHA and Iron Isomorphous BEA Frameworks A catalyst slurry was prepared by mixing a molecular sieve material having a blend of copper exchanged chabazite framework and iron isomorphous beta framework (in a 3:1 ratio) with an alumina powder (25f4 DISPAL®) as a binder. The catalyst slurry was coated onto a cordierite honeycomb substrate. The supported catalyst is then hydrothermally ages at 800° C. for 5 hours.

Comparative Example 3

The preparation method described in Example 7 was repeated, except that the slurry was prepared with Ludox® AS40 colloidal silica (40 weight percent silicon dioxide suspension in water) as a binder.

Example 9: NO/$NO_2$ Conversion

The supported catalyst prepared in Examples 7 and 8 and Comparative Example 3 were tested for $NO_x$ conversion and $N_2O$ production using a Synthetic Catalyst Activity Test (SCAT) rig under the following conditions: feed gas=500 ppm NO, $NH_3$, alpha=1.5, a space velocity (SV) of 60,000/hour.

Figure 7:
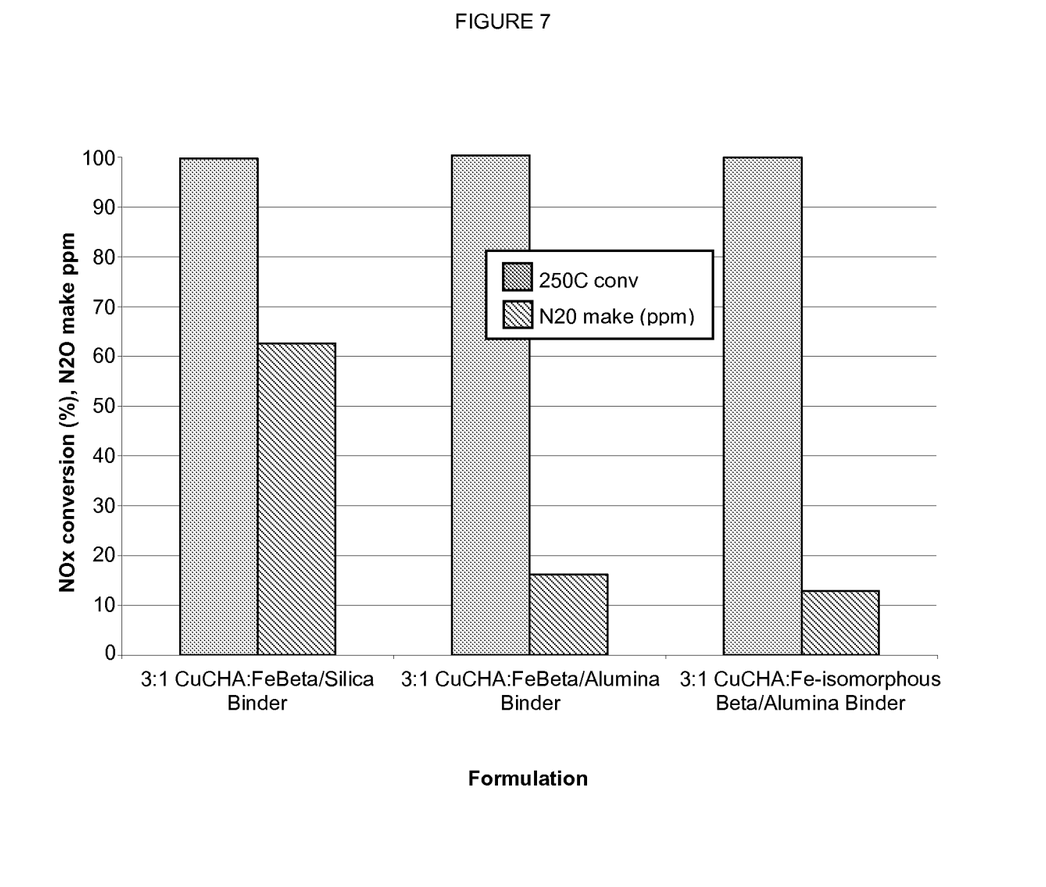
FIG. 7 is a graphical depiction of $NO_x$ conversion data and $N_2O$ generation data according to certain embodiments of the invention.

The samples were tested to determine $NO_x$ conversion and $N_2O$ production at 250° C. The test results are shown in FIG. 7. The results show that, compared to a silica binder, an alumina binder provides increased $NO_x$ conversion and decreased $N_2O$ production when used with a molecular sieve material comprising a blend of copper exchanged CHA and iron exchanged BEA frameworks.

What is claimed is:

1. A catalytic article, comprising:
   a. a honeycomb substrate;
   b. a catalyst washcoat disposed on and/or within the substrate, wherein the catalyst washcoat comprises (i) an aluminosilicate molecular sieve having at least one of a beta (BEA) and chabazite (CHA) framework, and about 1 to about 10 weight percent of at least one base metal component selected from iron and copper, wherein said weight percent is based on the weight of the aluminosilicate molecular sieve; and (ii) about 1 to about 30 weight percent of a binder consisting essentially of alumina, wherein said weight percent is based on the weight of the aluminosilicate molecular sieve.

2. The catalytic article of claim 1, wherein the catalytic article, upon hydrothermal aging, provides higher $NO_x$ conversion than a comparable article having a silica binder.

3. The catalytic article of claim 1, wherein said alumina is γ-alumina.

4. The catalytic article of claim 1, wherein said alumina is derived from boehmite.

5. The catalytic article of claim 1, wherein said alumina in said washcoat has a mean disperse particle size of about 60 to about 120 nm.

6. The catalytic article of claim 1, wherein said alumina in said washcoat has a mean crystallite size of about 5 to about 15 nm.

7. The catalytic article of claim 1, wherein said alumina binder in said washcoat is present in an amount of about 10 to about 20 weight percent based on the weight of the aluminosilicate molecular sieve.

8. The catalytic article of claim 1, wherein said aluminosilicate molecular sieve has a CHA framework and has a silica-to-alumina ratio of about 15 to about 250.

9. The catalytic article of claim 8, wherein said base metal is copper.

10. The catalytic article of claim 1, wherein said aluminosilicate molecular sieve has a BEA framework.

11. The catalytic article of claim 10, wherein said base metal is iron.

12. The catalytic article of claim 11, wherein said BEA is isomorphic BEA.

13. The catalytic article of claim 1, wherein said washcoat comprises a blend of a molecular sieve having a CHA framework and a molecular sieve having a BEA framework.

14. The catalytic article of claim 13, wherein said molecular sieve having a CHA framework comprises copper and said molecular sieve having a BEA framework comprises iron.

15. The catalytic article of claim 14, wherein said blend is essentially homogeneous with respect to the molecular sieve having a CHA framework and the molecular sieve having a BEA framework.

16. The catalytic article of claim 15, wherein said blend comprises a majority of said molecular sieve having a CHA framework relative to the molecular sieve having a BEA framework.

17. The catalytic article of claim 16, wherein said blend comprises said molecular sieve having a CHA framework and the molecular sieve having a BEA framework are present in a ratio of about 1.5:1 to about 10:1.

18. The catalytic article of claim 17, wherein said blend comprises said molecular sieve having a CHA framework and the molecular sieve having a BEA framework are present in a ratio of about 2:1 to about 4:1.

19. The catalytic article of claim 1, wherein said substrate is a flow-through monolith or a wall-flow monolith.

20. A method of making a catalytic article for treating an exhaust gas comprising the steps of:
   a. providing a washcoat comprising:
      i. a catalyst comprising at least one aluminosilicate molecular sieve having at least one of a beta (BEA) and chabazite (CHA) framework, and about 1 to about 10 weight percent of at least one base metal component selected from iron and copper, wherein said weight percent is based on the weight of the aluminosilicate molecular sieve; and
      ii. about 1 to about 30 weight percent of a binder consisting essentially of alumina, wherein said weight percent is based on the weight of the aluminosilicate molecular sieve;
   b. applying the washcoat to a plurality of channels of a substrate; and
   c. drying the washcoat applied to the substrate such that the catalyst is fixed to the substrate.

* * * * *